Sept. 24, 1968     P. D. SCHWIEBERT     3,402,925
IMPACT ENERGY ABSORPTION DEVICE
Filed March 3, 1966
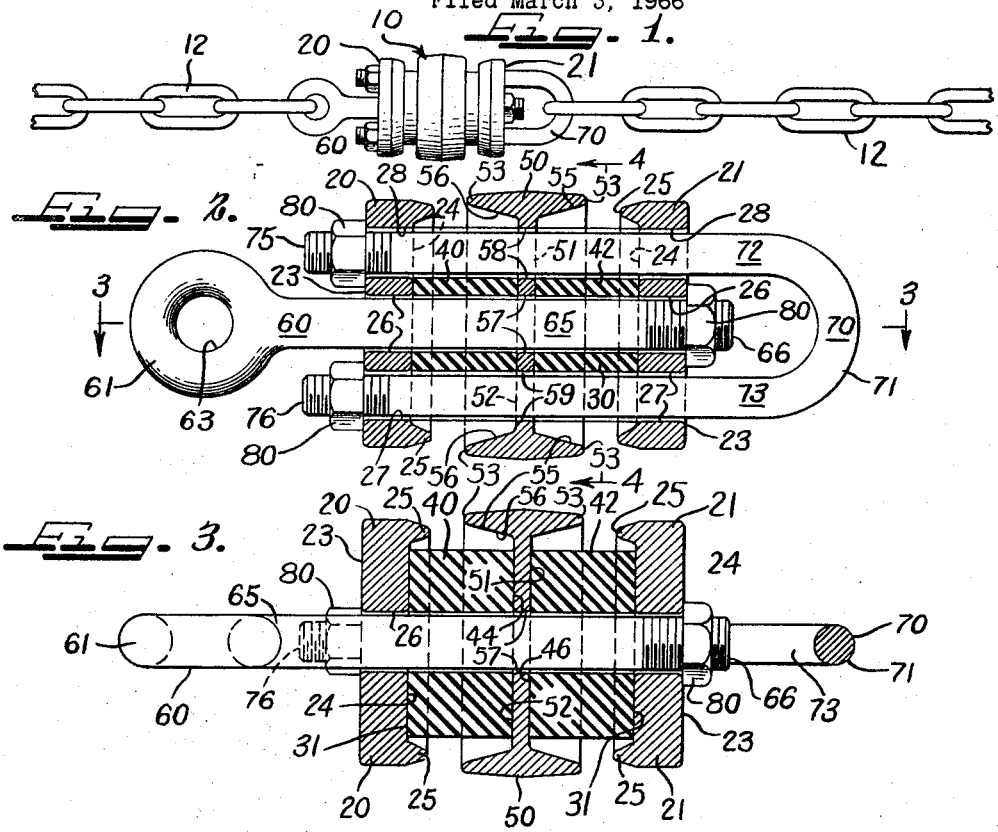
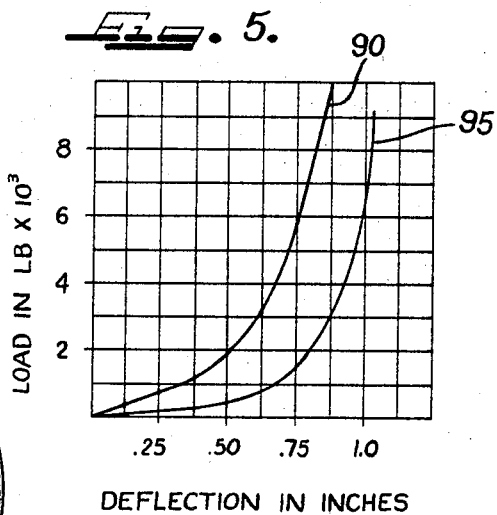
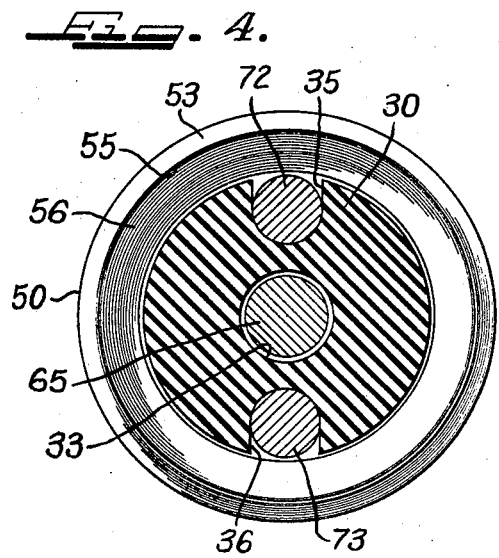
INVENTOR
PHILLIP D. SCHWIEBERT
BY
Horton, Davis, Brewer & Brugman
Attys.

United States Patent Office 3,402,925
Patented Sept. 24, 1968

3,402,925
IMPACT ENERGY ABSORPTION DEVICE
Phillip D. Schwiebert, Glencoe, Ill., assignor to MacLean-Fogg Lock Nut Co., Mundelein, Ill., a corporation of Delaware
Filed Mar. 3, 1966, Ser. No. 531,611
3 Claims. (Cl. 267—71)

ABSTRACT OF THE DISCLOSURE

An energy absorption device utilizing elastomeric material in compression for resilient absorption of force and energy, and wherein the elastomeric material is divided into segregated blocks which are utilized in a series arrangement to limit the necessary size of the unit, improve force absorption characteristics and limit the force effected distortion thereof, and also wherein the force effected distortion of the elastomeric material is physically and progressively limited by confinement within relatively rigid structure which avoids and prevents injury to the material.

---

This invention relates generally to an Energy Absorption Device, and more particularly, to an improved device which provides optimum stiffness with increased shock absorption at a correspondingly reduced load deformation therefor.

The transportation of articles, such as vehicles and heavy machinery on railway flat cars, or the like, requires the employment of rugged and flexible tie-down supports for securement of the articles thereon. It is desirable to provide for shock absorption within the lading ties. Shock absorbers employing an elastomeric material, such as a rubber, or the like, have been found to be ideal in providing some measure of impact energy absorbing ability in a manner insuring a taut, resilient and flexible lading tie. Such devices are found also to be an aid in the simplified tightening and release of the lading tie. Extreme loads, on the order of 18,000 pounds or more, are often encountered, and thus require that the elastomeric compression material be as stiff as practical, yet sufficiently resilient. Unfortunately, the stiffest extruded elastomeric material, to date, having the other necessary physical characteristics, is too soft, having unsuitable load deformation characteristics. In the prior art devices, severe extrusion damage to the elastomeric material was encountered under extreme load. In order to meet extreme load requirements, it is found that the prior art devices required that the elastomeric compression material be considerably enlarged in bulk, which, of course, was unwieldy and therefore unsatisfactory.

Therefore, to overcome the foregoing and other difficulties of the prior art, the general object of this invention is to provide a new and better energy absorption device which has an increased capacity of energy absorption at a correspondingly reduced load deformation therefor.

One of the objects of this invention is to provide an improved energy absorption device which is compact, of minimum size and weight, by employing an elastomeric compression member having stiff, but effective minimum deformation characteristics under load.

It is an object of this invention to provide an energy absorption device which has a novel configuration that protects an elastomeric compression member therein from severe extrusion damage.

A further object is the provision of additional bearing areas and shorter effective compression axes in an elastomeric compression member, thereby increasing the energy absorption therein at a correspondingly reduced load deformation.

It is still another object to provide an impact energy absorption device which is simple in construction and operation, and which is economical to produce by utilizing conventional, currently available components and materials that lend themselves to standard mass production manufacturing techniques.

Further and other objects, and a fuller understanding of the invention may be had by referring to the following description and claims, taken in conjunction with the accompanying drawings in which:

FIG. 1 is an elevational view of the invented device shown connected within a typical flexible lading tie for the absorption energy therein;

FIG. 2 is a cross-sectional side view of the energy absorption device illustrating the interior details thereof;

FIG. 3 is a cross-sectional top view of the invented device illustrated in FIG. 2, the section being taken substantially as illustrated by a broken line 3—3 and the accompanying arrows in FIG. 2;

FIG. 4 is a cross-sectional end view of slightly enlarged scale, taken in the direction of the arrows along lines 4—4 of FIG. 2;

FIG. 5 is a graphical representation of a load deformation comparison between the present invention and prior art devices.

For the purpose of illustrating the invention there is shown in the drawings a form which is presently preferred, it being understood, however, that this invention is not limited to the precise arrangements and instrumentalities shown.

Referring now to the drawings in detail, wherein like numerals indicate like elements, there is shown in FIG. 1 an illustration of the energy absorption device of the present invention designated generally at 10. Portions of a typical flexible lading tie, that is, a tie-down chain 12, are shown with the device 10 connected therein for absorption of energy therealong.

An identical pair of disc-shaped end members 20, 21 are provided in the device 10 for the reception and uniform distribution of force effected by tension in an associated tie line. Referring to the detail of FIGS. 2 and 3, it may be seen that the end members 20, 21 each have an outer face 23 and a flat inner bearing surface 24. A flange 25 projects outward from the bearing surface 24 at the periphery of each end member 20, 21, as illustrated. The end members 20, 21 each have a center opening 26 with a pair of side openings 27, 28 aligned on either side thereof. The two end members 20, 21 are disposed in reverse relationship, as shown, and thereby present the inner bearing surfaces 24 at an opposed relationship, in respect to each other. Preferably, the end members 20, 21 are of a solid and rugged configuration, formed of high strength metal, which is easily manufactured by known mass production techniques, such as casting or forging.

The elastomeric compression member 30 is a cylindrical block of suitable elastomeric material, such as a commercially available rubber, or the like. Naturally, the rubber compound utilized should be as stiff as practical and yet able to maintain a high fatigue and load resistance. As disclosed in the drawings, the diameter of the cylindrical shape of elastomeric member 30 fits within the peripheral flange 25 of the end members 20, 21. Thus, in the manner shown, the elastomeric compression member 30 is seated between the end members 20, 21 with an end area 31 of the cylindrical shape evenly abutting against each of the opposed bearing surfaces 24 of the end members 20, 21. An axial opening 33 passes completely through the elastomeric compression member 30 and diametrically opposed grooves 35, 37 extend along the sides of the cylindrical shape, as may be best visualized with reference to the cross-section of FIG. 4. Notice that the elastomeric member 30 is divided into two equal and identical segments 40 and 42. The individual segments 40, 42 provide flat adjacent areas 44, 46 normal to a central axis passing through the cylindrical shape. It is understood, in accordance with geometric principals, that the flat adjacent areas 44, 46, at other than a normal disposition with reference to the cylindrical axis of the elastomeric member 30, would be somewhat larger in area, that is, the areas 44, 46 would be elongated ellipses, instead of circles. Such larger areas may be utilized within the purview of the principles employed by the present invention, as will be fully apparent from the discription to follow, in the event that such be desirable.

A disc-shaped separator member is positioned between the segments 40, 42 to provide additional bearing surfaces 51, 52, which abut flush against the flat adjacent areas 44, 46. A peripheral flange 53 extends outwardly from each of the additional bearing surfaces 51, 52, as shown. The peripheral flanges 53 each include a marginal portion 55, which is spaced radially from the elastomeric member 30, a sufficient distance for reception of the flanges 25 of the end members 20, 21 upon a movement together of the end members 20, 21, and the separator member 50. Inner tapered portions 56 adjoin the outer portion 55 of the flanges 53 and provide a tapered configuration surrounding the elastomeric member 30, which limits the radial outward deformation thereof in a controlled manner, preventing severe extrusion damage to the elastomeric member 30 during an extreme load thereon. The separator member 50 includes therethrough, a central opening 57, and, aligned on either side thereof, a pair of side openings 58, 59. It is preferable that the separator member 50 also be suited to mass production and of a sturdy, durable material adapted to forging or casting similar to that of the end members 20, 21; however, it may be lighter in construction, since the principal stresses that it must withstand are equal and opposed. In this respect, it is to be noted that a reinforced cross-section is provided at the flanges 53 by the innermost tapered area 56, in order to resist the radially outward stresses of the elastomeric compression member 30 during energy absorption.

The center opening 26 and side openings 27, 28 of the end members 20 and 21 are in register with the axial opening 33 and grooves 33, 37 of the elastomeric compression member 30, respectively, which are in turn in register with the central opening 57 and side openings 58, 59 of separator member 50, respectively, thereby providing a central passageway and side passageways through the device 10.

Eye-bolt 60 may be an available commercial bolt having a suitably high tensile strength. As shown, the connector end 61 of the bolt 60 includes an eye-opening 63 therethrough. The eye-bolt 60 includes a stem portion 65 extending from the connector 61 end and having a threaded end 66. As illustrated, the stem 65 extends through the central passageway formed by center openings 26, axial opening 33, and central opening 58 of the end members 20, 21, elastomeric member 30, and separator member 50 respectively. Threaded end 66 extends outward from the one end member 21, while the connector end 61 extends outward from the opposite end member 20, as shown.

A U-bolt 70 is also a commercially available bolt of high tensile strength having a U-shaped connector end 71 and stems 72, 73 threaded at ends 75 and 76. As shown, the stems 72, 73 extend completely through the side passageways provided by side openings 27, 28 of end members 20, 21 the grooves 35, 37 of the elastomeric compression member 30, and the side openings 58, 59 of the separator member 50. The U-shaped connector end 71 extends outward from the one end member 21, while the threaded ends 75, 76 extend outward from the opposite end member 20, as illustrated.

Retaining nuts 80 are provided on each of the threaded ends 66, 75 and 76 of the eye-bolt 60 and U-bolt 70, respectively. As shown, the retaining nuts 80 engage respective outer faces 23 of the end members 20, 21.

Application of the invented device 10 may be accomplished, as illustrated at FIG. 1, by linking the connector end 61 to one portion of the tie-down chain 12, while the U-shaped connector end 71 is linked to a second portion of the chain. In this manner, it is apparent that the eye-bolt and U-bolt function as opposed links connected within the tie-chain 12. Thus, tension transmitted through chain 12, which may be caused by momentum, inertia, impact or shock, will be transmitted by means of the bolts 60 and 70, and their respective retaining nuts 80, in a direction tending to move together the end members 20, 21. A portion of the force energy present will be absorbed by elastic deflection and friction developed during a compression of elastomeric compression member 30.

The total friction which can be developed, for the most part, is a sum of that development between bearing surfaces 24 against the end areas 31 of elastomeric member 30, and the internal friction within the elastomeric material itself. It is to be noted that the present invention provides for the creation of additional friction between the flat adjacent areas 44, 46 and their respective additional bearing areas 51, 52, provided by separator member 50. Furthermore, more friction is developed against the stems 65, 72, 73 of the respective bolts 60, 70, and the flanges 25 and 53 of the end members 20, 21 and separator member 50, respectively. Naturally, the increased frictional development capacity of the invented device 10 also means a corresponding increase energy absorption capacity. The flat adjacent areas 44, 46 may be increased by providing additional segments and separator plates (not shown), it being clearly understood that the embodiment in the drawings is only one of several employing the principles of the present invention.

It is also to be noted that the segments 40, 42 each have a compression axis wich is one-half the length of the elastomeric compression member 30. Whereas the cross-sectional area of elastomeric material remains the same, the effective compression axis is diminished by one-half and, therefore, the deflection of the elastomeric member 30 under load is reduced, as shown by the curves of the graph of FIG. 5. The curve 90 represents load deformation of the invented device 10 as compared to the load deformations of the unsegmented prior art devices represented by curve 95. The curves 90, 95 become widely separated, demonstrating that for the same load conditions, the lad deformation of the device 10 of the present invention are reduced from those of the prior are devices, which tend to "belly-out" at a much greater rate. Thus, effective stiffness is increased by dividing the elastomeric member 30 and causing it to deform as distinct segments 40, 42.

Under normal usage in a tie-down application, the energy absorption devices 10 are slightly prestressed to provide an initial tension which consumes approximately one-half the available travel available in the unit. During a load the elastomeric compression member 30 will be compressed as the end members 20, 21 move towards the separator member 50. Under an extreme load the end members 20, 21 may continue moving together within the outer portions 55 of peripheral flanges 53 of the separator member 50, until they abut against the inner tapered portions 56, thereby "bottoming out" to stop any further inward movement thereof. At this point, it is to be noted that the compressed elastomeric member 30 is entirely encased by the end members 20, 21 and separator member 50 in a manner preventing extrusion damage thereto. As the segments 40, 42 of the elastomeric compression member 30 are compressed together they will be deformed radially outward against the tapered portions 56 of the peripheral flange of separator member 50. Radial deformation of the elastomeric member 30 at ends 31 are confined by the peripheral flanges 25 of end members 20, 21. The taper of flange 56 may be chosen to provide a frictional surface and to insure a controlled deformation preventing severe damage to the elastomeric compression member 30.

The present invention may be embodied in other specific forms without departing from the spirit or potential attributes thereof and, accordingly, reference should be made to the appended claims, rather than to the foregoing specification as indicating the scope of the invention.

I claim:
1. A tension device for absorption of energy along a flexible support, comprising: a pair of end members disposed to provide opposed bearing surfaces therebetween, said end members having openings therethrough; an elastomeric compression member between said opposed bearing surfaces, said elastomeric member having a plurality of individual segments in alignment along an axis normal to said opposed surfaces; a separator member between adjacent of said segments to provide additional bearing surfaces therebetween; a pair of opposed links for connection in said flexible support, said links having stems extending through said openings of said end members; and retaining means on said stems of each of said links for engagement against said end members upon tension between said links to move said end members together and compress said elastomeric member for absorption of energy thereby, said individual segments and additional bearing surfaces providing a greater capacity of energy absorption at a correspondingly reduced load deformation therefor, said elastomeric member having two identical segments, and said end members and separator member each having a peripheral flange surrounding said elastomeric member, said flange limiting a radially outward deformation of said elastomeric member to prevent severe extrusion damage thereto during an extreme load thereon, the periphery of said separator member being greater than the peripheries of said end members for reception of said end members within said peripheral flange of said separator member upon a movement together of said end and separator members, and said flange of said separator member having an innermost configuration tapering outwardly from said elastomeric member.

2. A tension device for absorption of energy along a flexible support, comprising: a pair of identical, disc-shaped end members having outer faces and inner bearing surfaces which include peripheral flanges projecting therefrom, each of said end members having therethrough a center opening with a pair of openings aligned on either side thereof, said end members disposed with said bearing surfaces in an opposed relationship; an elastomeric compression member between said bearing surfaces and having a cylindrical shape of a circumference fitting within said peripheral flanges of said end members, said elastomeric member having an axial opening therethrough and diametrically opposed grooves extending longitudinally thereof, said axial opening and grooves being in register with said center opening and pair of openings of said end members, respectively, said elastomeric member including two identical separate segments which have flat adjacent areas normal to said axial opening and grooves; a disc-shaped separator member between said segments, said separator member providing additional bearing surfaces at said flat adjacent areas and having therethrough a central opening with a pair of openings aligned on either side thereof in register with said axial opening and grooves of said elastomeric member to provide a central passageway and side passageways through said device, said separator member including peripheral flanges projecting in opposed directions from said additional surfaces, said flanges of said separator member having outermost portions spaced radially from said elastomeric member a sufficient distance for reception of said end members therein upon a movement together of said end and separator members, and said flanges of said separator member having innermost portions adjoining said outermost portions, said innermost portions tapering outward from said elastomeric member, said flanges of said end and separator members limiting a radially outward deformation of said elastomeric member to prevent severe extrusion damage thereto during an extreme impact load thereon; an eye-bolt having a stem extending through said central passageway, said eye-bolt including a threaded end projecting outward from one of said end members; a U-bolt having a pair of stems extending through said side passageways, said stems having threaded ends projecting outward from an opposite one of said end members, said eye-bolt and U-bolt being in an opposed relationship to provide links for connection in said flexible support; and retaining nuts on said threaded ends of said eye-bolt and U-bolt, respectively, said retaining nuts engaging said outer faces of said end members upon tension between said links to move said end members together and compress said elastomeric member for absorption of energy thereby, said individual segments and additional bearing surfaces providing a greater capacity of energy absorption at a correspondingly reduced load deformation therefor.

3. An energy absorbing device, comprising: a pair of end members disposed to provide opposed bearing surfaces therebetween; and elastomeric compression member between said opposed bearing surfaces, said elastomeric member having a plurality of individual segments; a separator member between adjacent of said segments to provide additional bearing surfaces therebetween; and means for transmission of energy to said end members in a direction moving said end members together and compressing said elastomeric member to absorb said energy, said individual segments and additional bearing surfaces providing an increased capacity of energy absorption at a correspondingly reduced load deformation therefor, said end members and said separator members each having a peripheral flange surrounding a substantial longitudinally compressible portion of said elastomeric member and spaced increasingly away from said elastomeric member in a lateral dircetion in general relation to the distance from the adjacent end of the elastomeric member, said flange limiting a radially outward deformation of said elastomeric member to prevent severe extrusion damage thereto during an extreme load thereon, and said flanges being of relative lengths and sizes to overlap one another along the exterior of the elastomeric member when a predetermined compression of each segment of the elastomeric member is reached.

References Cited
UNITED STATES PATENTS

| 99,320 | 2/1870 | Jones | 267—70 |
| 106,487 | 8/1870 | Ireland | 267—70 |
| 123,178 | 1/1872 | Jones | 267—70 |
| 2,038,527 | 4/1936 | Eaton | 267—70 |

ARTHUR L. LA POINT, *Primary Examiner.*

R. M. WOHLFARTH, *Assistant Examiner.*